United States Patent [19]  [11] 4,005,347
Erdman                              [45] Jan. 25, 1977

[54] ELECTRONICALLY COMMUTATED MOTOR AND METHOD OF MAKING SAME
[75] Inventor: David M. Erdman, Fort Wayne, Ind.
[73] Assignee: General Electric Company, Fort Wayne, Ind.
[22] Filed: June 24, 1974
[21] Appl. No.: 482,409
[52] U.S. Cl. .............................. 318/254; 318/138
[51] Int. Cl.² ...................................... H02K 29/00
[58] Field of Search ........................... 318/138, 254

[56]           References Cited
          UNITED STATES PATENTS

| 3,353,076 | 11/1967 | Haines    | 318/138 |
| 3,531,702 | 9/1970  | Hill      | 318/138 |
| 3,577,053 | 5/1971  | McGee     | 318/254 |
| 3,581,173 | 5/1971  | Hood et al. | 318/254 |
| 3,633,084 | 1/1972  | Rakes     | 318/254 |
| 3,634,873 | 1/1972  | Nishimura | 318/254 |
| 3,780,363 | 12/1973 | Doemen et al. | 318/254 |
| 3,783,357 | 1/1974  | Ichiyanage | 318/138 |

Primary Examiner—Gene Z. Rubinson
Attorney, Agent, or Firm—Ralph E. Krisher, Jr.

[57]              ABSTRACT

A brushless DC motor is constructed with photosensitive devices for detecting rotor shaft position. Arcuate permanent magnets on the rotor provide a DC flux field while distributed stator windings, each spanning a fixed number of slots in the armature assembly, provide mutually perpendicular magnetic fields. A logic circuit comprising NOR gates and transistor switches and drivers activated in response to signals from the shaft position sensors are utilized to control current switching in the stator windings of the motor. A light interrupting shutter mounted to the rotor cooperates with the light sensitive devices which are mounted to a supporting bracket fixed to the stator assembly in a manner to selectively preset advancement of commutation of the stator windings.

23 Claims, 18 Drawing Figures

ELECTRONICALLY COMMUTATED MOTOR AND METHOD OF MAKING SAME

CROSS REFERENCE TO RELATED APPLICATION

This application is related to my commonly assigned application Ser. No. 03-LO-4683 which was filed on the same day as this application and the entire disclosure of which is incorporated herein by reference.

BACKGROUND OF THE INVENTION

This invention relates generally to rotating dynamoelectric machines and, more particularly, to such machines that receive power from a direct current or rectified alternating current power supply and that utilize electronic commutation means.

In conventional direct current rotating machines, commutation is essentially a mechanical switching operation to control the currents through the armature winding sections. This operation is accomplished in conventional machines with brushes and segmented commutators. In such constructions, the brushes wear and require frequent replacement. Sparking and its attendant generation of RF noise is also unavoidably present.

These disadvantages frequently prohibit use of DC motors in critical applications even though the use of such motors might otherwise be favored. Early attempts to provide brushless DC motors were mostly limited to: DC to AC inversion and, essentially, AC induction motor operation; use of rotor velocity for switching control but such control then was not effective at all rotor positions; or use of circuits having a larger number of switching devices with the result that the circuits for such devices were both complicated and expensive.

I have now devised simpler and less expensive DC motors and have recognized that different restrictions apply to electronically commutated motors and those that apply to mechanically commutated motors. Improved motor performance over the already good performance of conventional motor designs may be obtained by using a rotor position sensing system in conjunction with electronic switching, and a permanent magnet rotor in combination with a selected unconventional stator winding arrangement for a direct current motor.

Motors embodying selected features of my invention are readily adapted for applications where space requirements are at a minimum. For example, such motors are readily adapted to drive the compressor of an automobile air conditioning system from the output of the alternator, or the compressor of a recreational vehicle battery source. In such arrangements, an electronically commutated motor and compressor may both be sealed in a hermatic enclosure. In sealed arrangements, carbon pollution products are objectionable and use of brushless motors in such arrangements provides a distinct advantage over mechanical commutation. However, since the units are hermetically sealed, the reliability of the motor must be very good, and all parts of the motor must be such that refrigerant will neither damage the motor nor be damaged by motor component or the materials from which said components are made.

Conventionally, motor manufacturers have a first type of specialized equipment, processes, tools and dies, etc., for AC induction motors and a second type of the same for DC motors. To a great extent, such AC motor making, e.g., tools, etc., are not useable for present DC motor production. In accordance with another feature of the invention DC stators embodying the invention may be wound using conventional AC winding machinery.

Thus, another important advantage of the subject invention is the cost saving achieved both in manufacture and operation.

Electronic commutation may be achieved by either a bridge or star connection. The former improves copper winding utilization, while the latter offers the advantage of simplified electronics and by judicious selection of winding parameters, magnet size and electronics which controls the commutation cycle, there is obtained a reliable, highly efficient brushless DC motor having a desired speed-torque which may be fabricated at a reasonable cost.

SUMMARY OF THE INVENTION

Accordingly, a primary object of the present invention is to provide brushless DC motor which is reliable and efficient in operation and method of making same.

Another object of the present invention is to provide an improved brushless DC motor which may be economically fabricated; may be constructed in a very compact package; or may be provided with shaft sensors disposed within a stator winding end turn envelope.

Still another object of the present invention is to provide an improved brushless DC motor wherein the advancement of commutation of the stator windings is controlled by the position of optical light coupling sensors.

Yet another object of the present invention is to provide a minimized number of position sensors in an electronically commutated motor and, more specifically, to provide a minimum number of position sensors.

A further object of the present invention is to provide an improved motor to be energized from a direct current or rectified alternating current source wherein the armature windings are of the distributed winding type.

Another further object of the present invention is to provide an electronically commutated motor that utilizes bifilar windings in the armature.

A still further object of the present invention is to provide an electronically commutated motor of a minimized physical size.

A still further object of the present invention is to provide an electronically commutated motor that includes means for protecting output stage solid state devices in a particular manner to provide energy recovery or conservation so as to increase the overall efficiency of an electronically commutated motor and the electronic means that provide commutation for such motor.

Yet a still further object of the present invention is to provide an electronically commutated motor wherein commutation is preselectively advanced.

In accordance with the present invention, there is disclosed an improved brushless DC motor having distributed stator windings which may be wound and connected, as desired, in either a star or bridge configuration. The rotor has positioned therein a pair of arcuate magnets each having a preferred minimum arcuate magnets each having a preferred minimum arc length per pole of at least about seventy to 90 electrical degrees, assuming that relatively high efficiencies are desired. Windings are disposed in the slots of an armature member and connected to, preferably, produce substantially mutually perpendicular magnetic fields when energized. Commutation of the windings is achieved by means of a solid state circuit controlled by sensing means including a pair of sensors spaced from each other by an arcuate distance of approximately 90 electrical degrees and which are preset relative to the armature assembly for a given rotor assembly.

In accordance with one preferred feature of the present invention, a minimum number of sensors are utilized, with this minimum number being equal to the number of binary digits needed to describe the number of switching positions, minus one, for the motor. For example, if the motor winding is to be switched four times per 360 electrical degrees of rotation, one would select the number of binary digits needed to describe the decimal number 3. As will be understood, two binary digits [i.e., 11] describe the number 3. Accordingly, only two sensors would need to be used. Since the number of sensors is relates to the switching positions per 360 electrical degrees of rotation, two sensors may be used for two pole, four pole, six pole, etc., motors.

On the other hand, if there are to be six switching positions per 360 electrical degrees of rotation of the motor, the number that would need to be described in binary digits would be six minus one, or five. Since the number five is identified, in binary notation, as the number 101, it will be understood tht three binary digits are involved and, accordingly, a minimum of three sensors would be utilized. At this point it should be further noted and further understood that three binary digits can represent a number as great as 111 in binary notation (which is equal to the number 7 in decimal rotation). Thus, three sensors may be utilized when as many as eight switching positions per 360 electrical degrees of rotation of the motor is desired.

In preferred embodiments of the invention illustrated herein, optical sensors are utilized in conjunction with one or more rotor mounted shutters. Whether optical or other types of sensors are utilized, the sensors are preset relative to the armature assembly (for a given rotor assembly) so that the switching point is advanced (i.e., so as to advance the commutation of the windings) such that a winding is energized before the rotor reaches its maximum torque per unit current producing position in order to aid the build-up of current in the winding being energized. This can yield higher torques, higher efficiencies, and higher speeds. The preferred amount of optimum advance, for a given motor design and desired end use, is primarily a function of motor speed, all as discussed in more detail hereinafter.

In one actual embodiment of the invention illustrated herein, light coupling sensors were used and were supported by a bracket that was slotted so as to permit adjustable attachment to a stator. Thus, adjustable advancement of commutation could be made to obtain either peak efficiencies or maximum speeds. When the sensors are to be permanently attached to the stator the amount of commutation advancement will be a fixed, preset amount for a given motor design. Of course, however, whether fixed or adjustable advancement is provided, it is preferred to provide an arm on a bracket that will be shaped to reach over the stator end turns and support the optical light sensors within the end turns, and thereby provide minimum overall motor dimensions.

BRIEF DESCRIPTION OF THE DRAWINGS

Other objects of the present invention and their attendant advantages will become readily apparent from the following description taken in conjunction with the accompanying FIGURES in which like reference characters are used to describe like parts throughout the several views.

DESCRIPTION OF THE PREFERRED EMBODIMENTS

Figure 1:
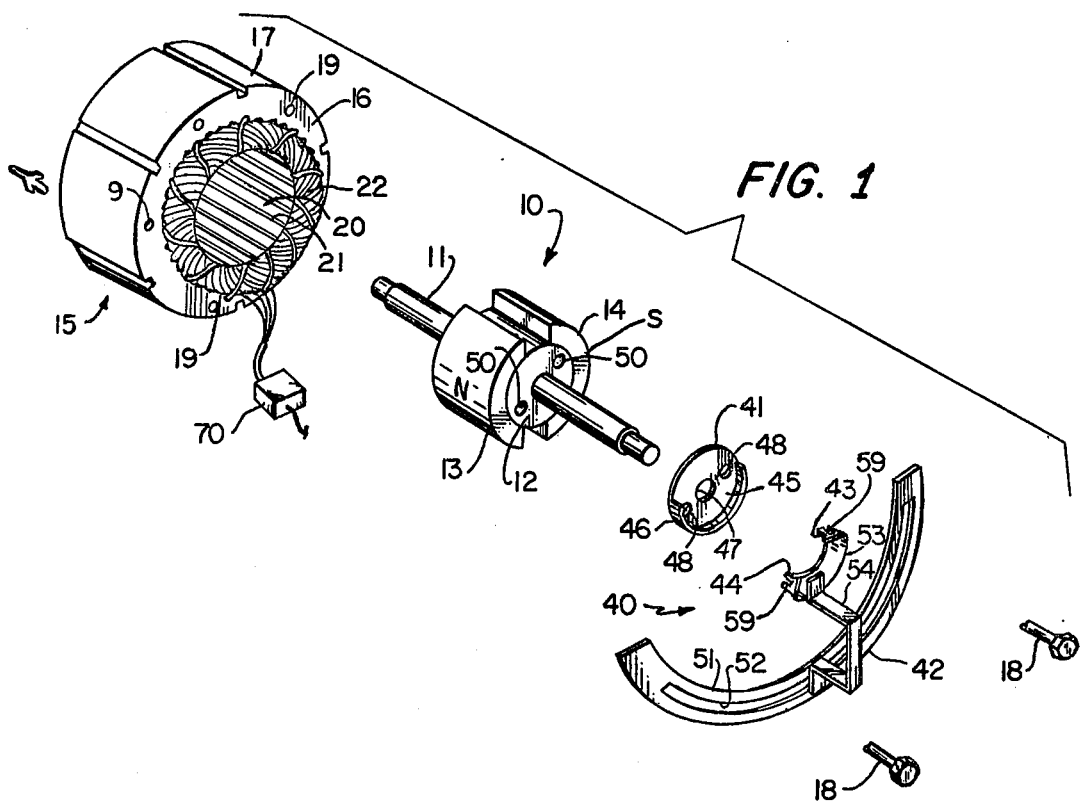
FIG. 1 is an exploded, perspective view of the main elements of a brushless DC motor embodying teachings of the present invention in one form thereof.

Referring to FIG. 1, there is illustrated the component parts of a brushless DC motor of one type that embodies the present invention in one preferred form. A permanent magnet rotor 10 is mounted on a shaft 11 which is rotatably supported by conventional not shown bearing means within any desired not shown housing. The rotor 10 is magnetized across its diameter in a manner known to the art. In the illustrated embodiment, the rotor 10 comprises a solid magnetic steel core 12 and a pair of arcuate magnets 13 and 14 disposed on the periphery of the core in diametrically opposed relationship. The magnets 13 and 14 were ceramic magnets, but it will be understood that they could be cobalt samarium, Alnico, or any other available type of magnet material. The primary selection criteria are expense and physical size of the motor. The arc length of each ceramic magnet is preferably between 135 electrical degrees and 160 electrical degrees, but could be as much as 180 electrical degrees and as low as approximately 90 electrical degrees. Arc lengths of less than 120 electrical degrees would generally result in poor efficiency with the winding arrangement specifically shown in FIG. 2, and are thus not preferred with such arrangement.

When the arc lengths are on the order of 90 electrical degrees, the windings would be made relatively more concentrated. For example, in a 24 slot stator used for two pole operation, the outer coils of each coil group preferably would span about 10 slots. In addition, each coil group preferably would include three coils per coil group spanning 9, 7, and 5 teeth, respectively. This type of arrangement would provide optimized efficiency characteristics of such motor.

The stationary armature assembly 15 includes a relatively low reluctance magnetic member 16 which is formed of a plurality of like stator laminations 17 assembled in juxtaposed relationship. The laminations may be held together by a plurality of stator through-bolts 18, only two of which are fragmentary shown, that pass through coaxially positioned through-bolt holes 19 in the stator lamination. alternatively, the core laminations may be welded, keyed, adhesively bonded together, or merely held together by the windings, all as will be understood by persons skilled in the art.

Each lamination includes a plurality of teeth 20 along its interior bore such that the assembled laminations provide a plurality of axially extending slots 21 within which the stator windings 22 are disposed.

Windings 22 may be wound by means of conventional induction motor winding machinery. Thus, the winding turns may be wound directly in the core slots; or the windings may be wound into a coil receiver and subsequently be axially inserted into the core slots, for example, with equipment of the type shown and described in U.S. Pats. Nos. 3,522,650 3,324,536, 3,797,105, or 3,732,897, the disclosures of which are incorporated herein by reference.

Preferably, each winding has a spread of 90 electrical degrees across the stator slots so as to generate mutually perpendicular magnetic fields when energized. The winding end turns extend beyond the core end faces, and the winding ends or leads are brought out and connected separately to the control circuit and the associated switching means.

Figure 2:
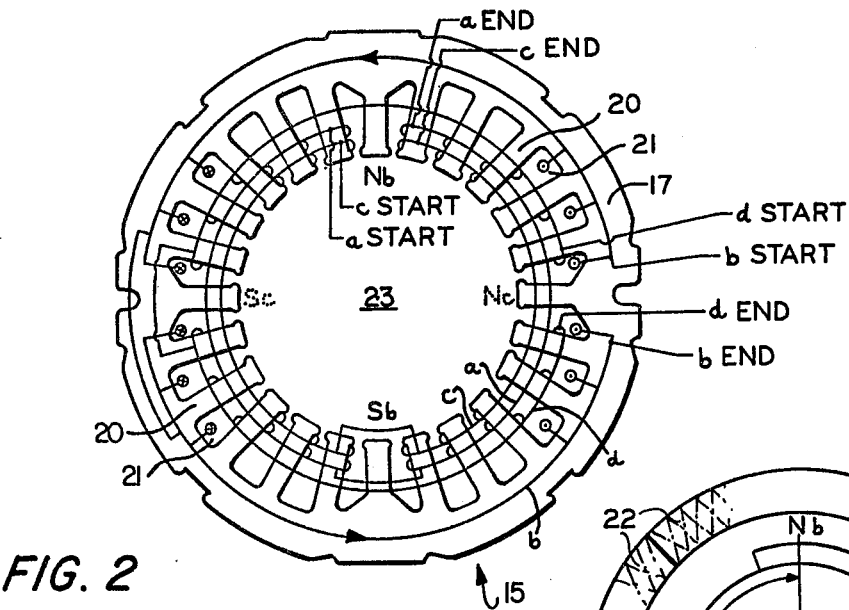
FIG. 2 is a diagrammatic front elevational view of the stator or armature core of FIG. 1, diagrammatically illustrating a selected winding arrangement for the motor of FIG. 1.

Referring to FIG. 2, there is illustrated an exemplary winding arrangement for a 1/20 horsepower, 3000 rpm electronically commutated DC motor embodying principles of my invention. The selected lamination or punching includes 24 slots, and 54 bifilar turns are provided for each winding. With the oppositely disposed pairs of windings would bifilarly, I provide four windings a, b, c, d. Windings a and c are bifilar wound and occupy the six uppermost and six lowermost slots 21, as viewed in the drawing, and are shown as being included by the dash lines. Windings b and b and d are bifilar wound, and occupy the six left-hand and six right-hand slots, as viewed in FIG. 2. The stator 17 is wound with a winding turn distribution of 10 turns, 10 turns, 7 turns, from outermost to innermost coil, respectively, for each coil group shown in FIG. 2. Each winding is shown as including two coil groups, of course. The particular number of turns in a slot for each winding and the resultant distribution could be varied according to the desired motor characteristics to be obtaind. For example, the outermost coils of each coil group could be maximized in number while the innermost coil turns are minimized so as to concentrate the winding. When the winding is so concentrated, a higher average torque will result (assuming stating core, rotor conversion winding resistance, and total turn count is held constant), but the switching point will be more critical, the amount of advancement may have to be changed and minimum locked rotor torque will be reduced. Also, dips in torque (during running and standstill) would be of greater amplitude, but of less duration.

As shown in FIG. 2, the turns of each winding are concentrically disposed in a given pair of slots with the desired number of turns in each slot. The winding of course continues in the next pair of slots, and the desired number of slots or teeth are spanned which in the illustrated embodiment is eleven teeth and providing a spread of, for example, 90 electrical degrees for each winding and enabling the windings to sequentially generate mutually perpendicular magnetic fields when sequentially energized. By using bifilar strands, two windings are wound simultaneously and one end of each strand may then be conveniently grounded to provide a star winding configuration. It is again noted that the arrangement is readily adapted for winding and placement by conventional winding machinery used for winding AC motors.

It will be noted that in FIG. 2, the winding b has been illustrated somewhat differently than windings a, c, and d. Winding b has been shown to illustrate the direction of current flow therein during at least one commutation period and arrows have been used to indicate the direction of current flow in the end turn portions of windings b. On the other hand, dots and crosses (enclosed within circles) have been used to illustrate the direction of current flow in the respective turns of winding b that are disposed within the magnetic core slots. With the notation used in FIG. 2, a dot would indicate that current is flowing upwardly out of the plane of the drawing, and crosses indicate current flowing downwardly relative to the plane of the drawing. With current flow as indicated by the dots and crosses in FIG. 2, winding b would establish north and south poles oriented as represented by the letters N and S in FIG. 2.

Figure 3:
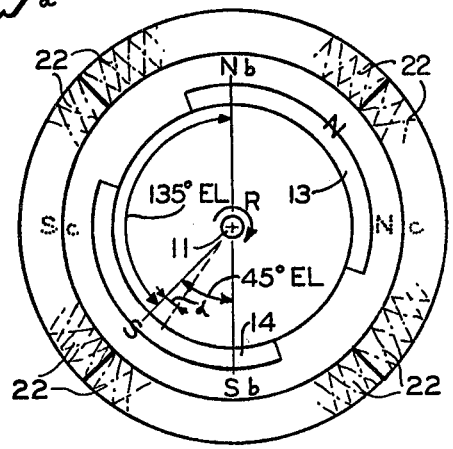
FIG. 3 is a diagrammatic representation of parts of the motor of FIG. 1 showing the position of the rotor magnets relative to the armature windings at the instant of turn-on of one of the windings, with a zero electrical degree advance setting.

The stationary armature assembly has an axial bore 23 within which is received the rotor 10. The arcuate magnets 13 and 14 are disposed (e.g., by an adhesive such as epoxy) on the outer surfaces of the low reluctance core 12 (which may be laminated but does not need to be) with North-South polarizations as indicated in FIG. 3. Magnetization is in the radical direction with radial thickness selected to produce the desired magnetomotive force (for a given magnet material) or to assure that no irreversible demagnetization occurs from the fields produced by the current in the stator windings during stalled conditions.

It will be understood that although magnets 13 and 14 have been described as being adhesively bonded to the outer peripheral surface of the core 12, it is important only that fields of opposite polarity be established by the rotor assembly. Thus, bar type magnets (or magnets of any other desired shape) may be utilized in the fabrication of rotor assemblies for motors embodying the present invention. The magnets (when permanent magnets are used) may be disposed within a magnetic iron cage structure or fabricated in any other desired manner. In fact, an excited rotor wherein the north and south poles are established by current carrying conductors may also be utilized. In the latter case, of course, slip rings or any other suitable means would be used to interconnect the rotor windings with a source of excitation current. The axial length of the magnets is dependent on the total flux desired. The instantaneous torque curves and the net torque output is dependent on the magnet arc or arc length beta ($\beta$) of the magnet which, as hereinbefore noted, should be preferably constrained within 135 electrical degrees and 160 electrical degrees, for greatest efficiency.

Adjacent one end of the rotor is positions a shaft position sensor assembly 40 comprising a shutter 41 and bracket 42 for supporting a pair of optical interrupter modules, i.e., optical light coupling sensors 43 and 44. Shutter 41 may be formed of any optical opaque (at the pertinent wave length) material or coated material such as, for example, aluminum (brass, steel, etc.), and includes a flat disc shape element 45 having a shutter flange 46 extending along the periphery of the disc element for an arcuate distance of approximately 180 electrical degrees. The disc element includes a central opening 47 slightly large in diameter than the diameter of the rotor shaft 11 so that it may be conveniently passed over the rotor shaft and mounted flush with the end face of the solid steel core 12. To this end, a pair of bolt receiving openings 48 are provided for receiving mounting bolts (not shown) adapted to be threaded into prethreaded openings 50 provided in the core 12. Of course, as should be readily apparent, other suitable arrangements could be utilized for mounting the shutter to the rotor, so long as flange 46 extends outwardly from the rotor and is cooperatively associated with sensors 43 and 44 to effect generation of rotor position reference signals in response to the position of the rotor relative to the stator.

Figure 4:
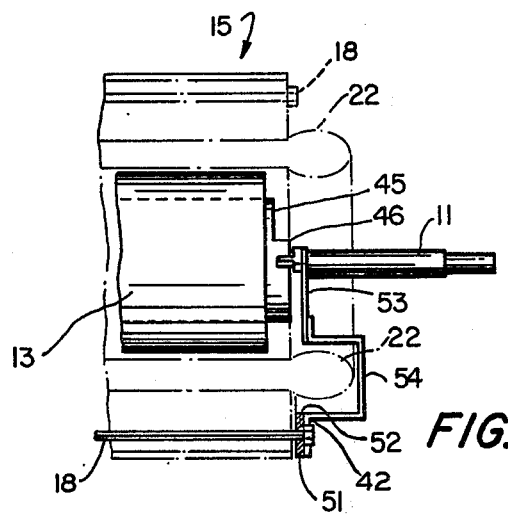
FIG. 4 is a fragmentary, side elevational view, partly in cross-section, better showing the physical interrelationship of the support bracket assembly in the motor assembly of FIG. 1.

As shown in FIGS. 1 and 4, bracket 42 comprises a first arcuate shaped segment 51 having an elongated slot 52 along its length. Slot 52 permits the bracket to the adjustably attached to the stator laminations 17 by means of the stator through bolts. A second arcuate shaped segment 53 is supported radially inward of the first segment by means of an interconnecting U-shaped strap for arm member 54. As more clearly shown in FIG. 4, strap 54 is shaped to pass over the end turns and support the sensors 43 and 44 with a 90° spatial orientation within the end turns of the stator windings and in cooperative relationship with the outward extending shutter flange 46. It should be noted that the sensors are supported within the outermost axial dimension of the winding end turns as well as within the radial dimensions thus minimizing the axial length of the motor, the dimension of the strap adding very little to the overall axial length.

Figure 5A:
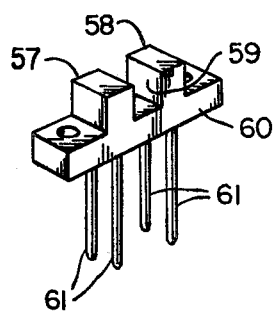
FIGS. 5A and 5B illustrate the construction and equivalent electrical circuit, respectively, of a light sensitive element used as a shaft position sensing element in the assembly of FIG. 1.
Figure 5B:
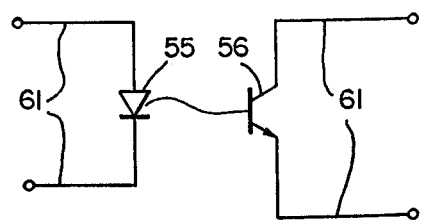

Referring to FIGS. 5A and 5B, there is illustrated a typical mechanical and electrical configuration of an optical sensor adaptable for use with the present invention. Such sensors are conventional commercial devices and may be, for example, General Electric H13A2 optical couplers. As shown, the coupler includes a source of light energy 55 which may be a light emitting diode and a light sensor 56 which may be a light sensitive phototransistor in light coupling relationship with the light emitting diode. Diode 55 and phototransistor 56 are formed in separate blocks 57 and 58, respectively, separated by a channel 59 and mounted to a supporting base 60. Base 60 of each sensor is secured at opposite ends of supporting segment 53 such that the sensors are spaced from each other by an arcuate distance of 90 electrical degrees. Convenient openings are provided in the segment to allow the terminal conductors 61 of the sensors to pass freely therethrough.

Commutation of the stator windings is achieved by means of a solid control circuit 70 comprising NOR gates and transistor switches and drivers activated in response to signals from the shaft position sensors. The circuit may be of the type illustrated in FIGS. 6 and 7 where a star winding configuration is employed or of the type illustrated in FIGS. 7, 9 and 10 where a bridge arrangement is employed.

In either case, current switching in the stator windings is preselectively set by the relatively positioning of the sensor so that commutation of the stator winding is advanced as is hereinafter explained.

Briefly summarizing operation of the circuit, it will be apparent from the several schematic figures that the control circuit receives the output of the light sensitive shaft position sensor assembly 40 to derive switching signals for commutation of the stator windings. To this end, the outputs of the sensors 43 and 44 produce two position signals indicative of the position of rotor 10 with respect to the fixed position of the stator windings. The two position signals are applied to a first signal conditioning circuit 70 which develops four control signals which correspond to those positions of the rotor while (1) shutter flange 46 is passing through channel 59 of sensor 43 thereby blocking its photosensor; (2) shutter flange 46 is passing through channel 59 of both sensors 43 and 44 thereby blocking both photosensors; (3) shutter flange 46 is passing through channel 59 of sensor 44 and blocks the photosensor of sensor 44 but has unblocked the photosensor of sensor 43; and (4) shutter flange 46 is clear of both sensors. In this manner, the shutter operates to block or intercept the light from the source of light energy of each optical coupler during one half of each revolution of the rotor, while permitting passage of light energy from each source of light to its associated photosensor during the remaining half of the rotor revolution. However, by supporting the sensors in a 90° spatial relationship, the on-off combination of the sensor provides four position control signals, while the adjustable bracket assembly provides a convenient means for preselectively advancing the commutation of the windings and aid the build-up of current in the winding being commutated and obtain a desired speed-torque relationship with greater efficiency.

Figure 7:
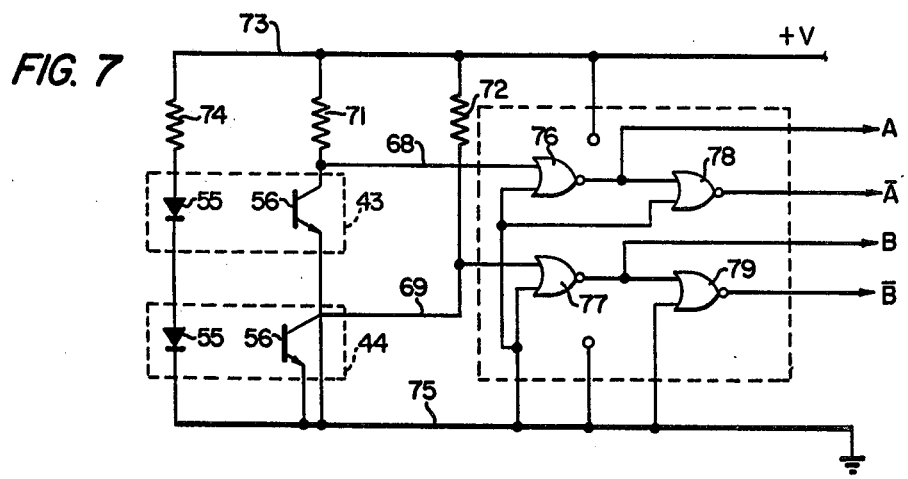
FIG. 7 is a schematic diagram of the signal conditioning circuit, shown in block form in FIG. 6, for producing position control signals indicative of the rotational position of the rotor of FIG. 1.

Referring to FIG. 7, it will be understood that the output of each coupler 43, 44 is high when the energy received from the LED 55 is prevented from exciting the associated phototransistor 56, i.e., when shutter flange 46 passes between the LED and the phototransistor. As will be understood from considering FIG. 7, a first position signal occurs whenever the coupler 43 is blocked and this signal appears on line 68. A second position signal occurs whenever coupler 44 is blocked and this signal appears on line 69.

As hereinbefore noted, each coupler consists of an LED 55 and a phototransistor 56. The collector of each phototransistor is independently connected through an associated resistor 71 or 72 to a positive bus line 73. Diodes 55 are connected in series and in turn through biasing resistor 74 to the positive bus 73. The emitters of the phototransistors and the series connected diodes are returned to a common ground line 75.

Figure 8:
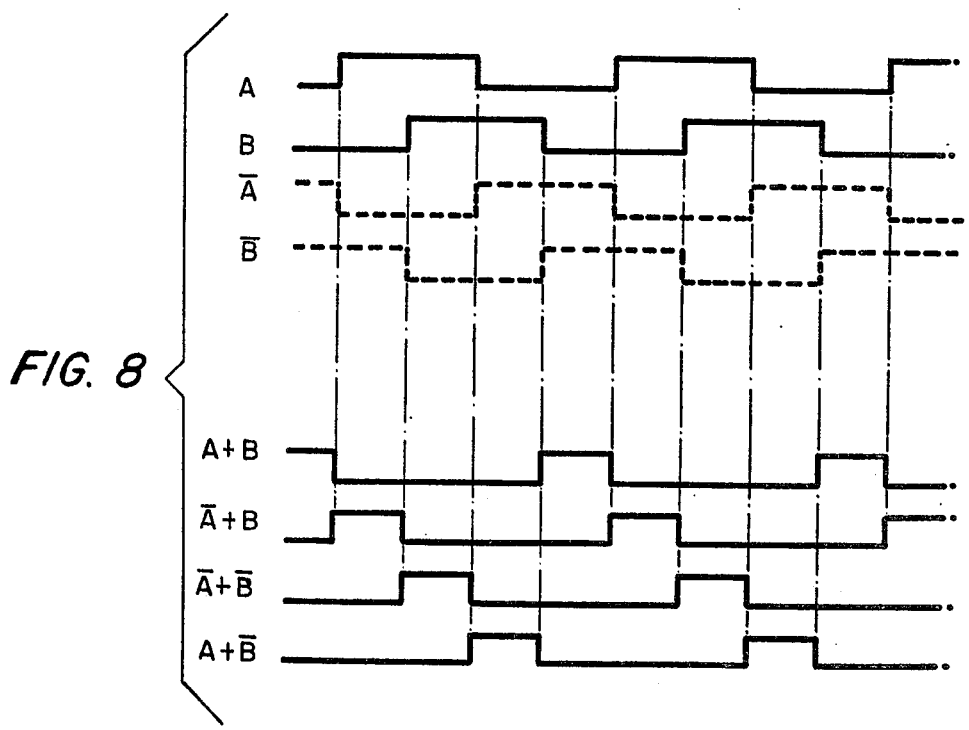
FIG. 8 illustates the relative relationship between the angular position of the rotor and the outputs of two light sensitive elements, A and B, and the switching pulses produced as a result of rotor rotation.

The first signal conditioning circuit includes four NOR gates arranged to develop the four position control signals A, $\overline{A}$ (not A), B, and $\overline{B}$ (not B) which are indicative of the rotational position of the rotor 10 (within a 90° region) and which are utilized to control current switching in the stator windings. To this end, one input of each NOR gate 76 and 77 is connected to lines 68 and 69, respectively, and the other inputs of each NOR gate 76 and 77 are returned to ground line 75. The outputs of NOR gates 76 and 77 establish the A and B position control signals applied to the second signal conditioning circuit. The A and B control signals are also applied respectively, to one of the input terminals of NOR gates 78 and 79, the output of which comprises the $\overline{A}$ (logic compliment not A) and $\overline{B}$ (logic compliment not B) position control signals. The other input of each NOR gate 78 and 79 is grounded. The duration and sequence of the signals A, $\overline{A}$, B, and $\overline{B}$ are schematically depicted in the upper portion of FIG. 8.

Figure 6:
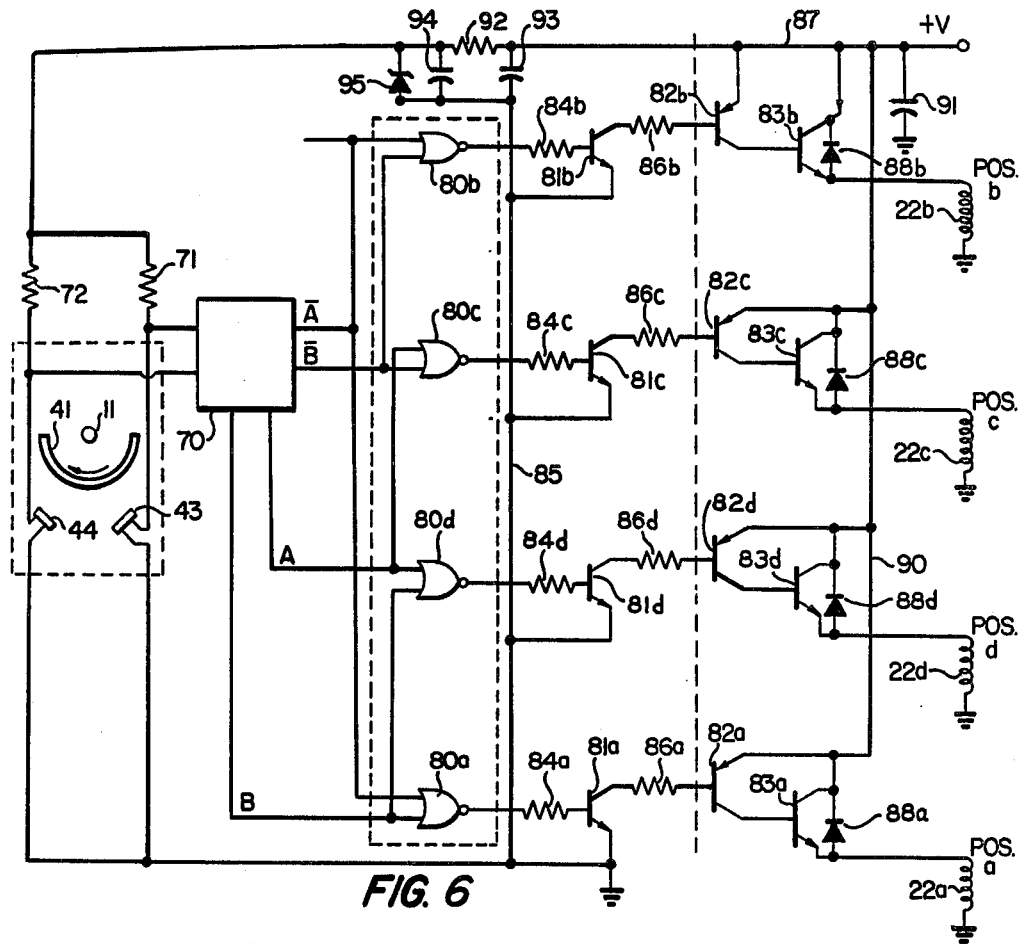
FIG. 6 is a schematic diagram of a solid state commutating circuit embodying features of the present invention and arranged for switching the windings of the motor of FIG. 1 when such windings are connected in a star configuration.

The four position control signals A, $\overline{A}$, B and $\overline{B}$ are applied to the second signal conditioning circuit shown in detail in FIG. 6. The function of the second signal conditioning circuit is to produce four switching signals for sequentially switching the associated stator windings 22a, 22b, 22c and 22d. To this end, each winding is associated with a separate signal channel including its own NOR gate 80, transistor 81 and driving stage comprising transistors 82 and 83. Operation of each channel is identical and to avoid duplication, the description will be limited to the operation of a single channel. The channel for the a winding is referred to as the a channel and the associated components in that channel have each numerical reference character followed by the letter a to signify its association with that channel. Thus, the a channel controls switching of winding a, the b channel controls switching of winding b, and so forth.

Channel a is shown as the lowermost channel of the second signal conditioning circuit in FIG. 6. NOR gate 80a has its two inputs connected to receive the $\overline{A}$ and B inputs from NOR gates 78 and 77. Likewise, each of the other channels are arranged to receive two position control signals from the first signal conditioning circuit 70 such that the four channels produce four successive switching pulses for each revolution of the rotor, as best understood by referring to the lower half of FIG. 8. In this portion of FIG. 8, the duration and sequence of the signals A + B, $\overline{A}$ + B, $\overline{A}$ + $\overline{B}$, and A + $\overline{B}$ are schematically depicted.

Logic is performed with two inputs for each gate. The gates are connected in such a way that when the output of one NOR gate is a 1, the outputs of the other NOR gates are at zero. Gate 80a, for example, has a 1 output when the $\overline{A}$ and B inputs are both at zero. This occurs just once in a revolution of the shutter 41. Similarly, for gate 80b, its output is 1 when the $\overline{A}$ and $\overline{B}$ inputs are at zero. This, again, is a singular combination in each revolution. Gates 80c and 80d are in like manner connected to A, $\overline{B}$ and A, B inputs, respectively.

The switching signals from each NOR gate 80 are amplified by an associated transistor 81 to which the switching signal is applied through a base resistor 84. The output of each transistor 81 is directed to the base circuits of a power switch set comprising transistors 82 and 83 which are switched to effect energization of the stator windings 22a–22d in a predetermined timed relation. Transistor 81 comprises an NPN transistor, the emitter of which is grounded through line 85. The collector of each transistor 81 is connected through a resistor 86 to the base an NPN transistor 82. The collector and emitter of each transistor 82 are connected, respectively, to the base and collector of the associated transistor 83 forming a conventional modified Darlington configuration.

Each stator winding is connected through the collector-emitter junction of its associated transistor 83 to the positive bus 87. A protective diode 88 is connected across the emitter-collector of each transistor 83 to provide a current path from the associated winding to the positive bus line 87. To this end, the anode of each diode 88 is connected to the ungrounded side of the associated winding 22 and the emitter of transistor 83 to insure that the polarity of the diode is such as to allow the return of energy released by the decaying magnetic field of a winding when it is deenergized. The back current generated by the decaying magnetic field is shunted part the transistor 83 through line 90 causing the charging of capacitor 91 which is connected across the positive bus line and ground. The energy stored in capacitor 91 will be returned to the system upon discharge of the capacitor when the next winding is turned on resulting in an overall increase in efficiency of the motor. The improved efficiency may be as high as 10%.

The protective circuit formed by each diode 88 and capacitor 91 is equally effective for rectified AC and battery supplies. It should be noted that for a rectified AC line, the diodes associated with the supply source are switched in such direction as to allow current to flow through the motor, but not back to the line. Thus, the capacitor 91 serves to store energy from the switched windings. Capacitor 91 could be replace by a Zenor diode which would absorb and dissipate the recovered energy as heat. While such an arrangement could provide protection to the transistors 83a, b, c, d, it would not provide for improved efficiency because the energy would be dissipated rather than being returned to the system.

Resistor 92 connected in positive bus line 87, together with capacitors 93, 94 and a 15-volt Zenor diode 95 (for a nominal applied average voltage of 12 volts) provides a protective filter network for the circuit components against the possibility of line 87 being raised to a voltage great enough to destroy the solid state components which could occur, for example, if the motor is run off a battery charger that could supply more than eighteen volt peaks.

Stator windings 22a–22d of FIG. 7 are wound bifilarly and are arranged in a star configuration with one end of each winding tied to a common ground. This provides an efficient arrangement which enables the windings to be switched on and off individually with a minimum of electronics and which enables the inductive energy of a switched winding to be recovered. In this connection, when winding 22a is turned off, for example, the decaying magnetic field induces a current in the companion conductor of winding 22c due to the bifilar winding arrangement and the resultant transformer action. The feedback diodes 88 around each switching transistor provide a path for current associated with trapped inductive energy and protect the transistor, while capacitor 91 enables this energy to be recovered. This arrangement provides for relative utilization of the windings in a slot of only 50%. To provide for full utilization of the windings, providing for even more efficient utilization of winding material, resort may be made to the bridge circuit arrangement of FIGS. 9 and 10.

Figure 9:
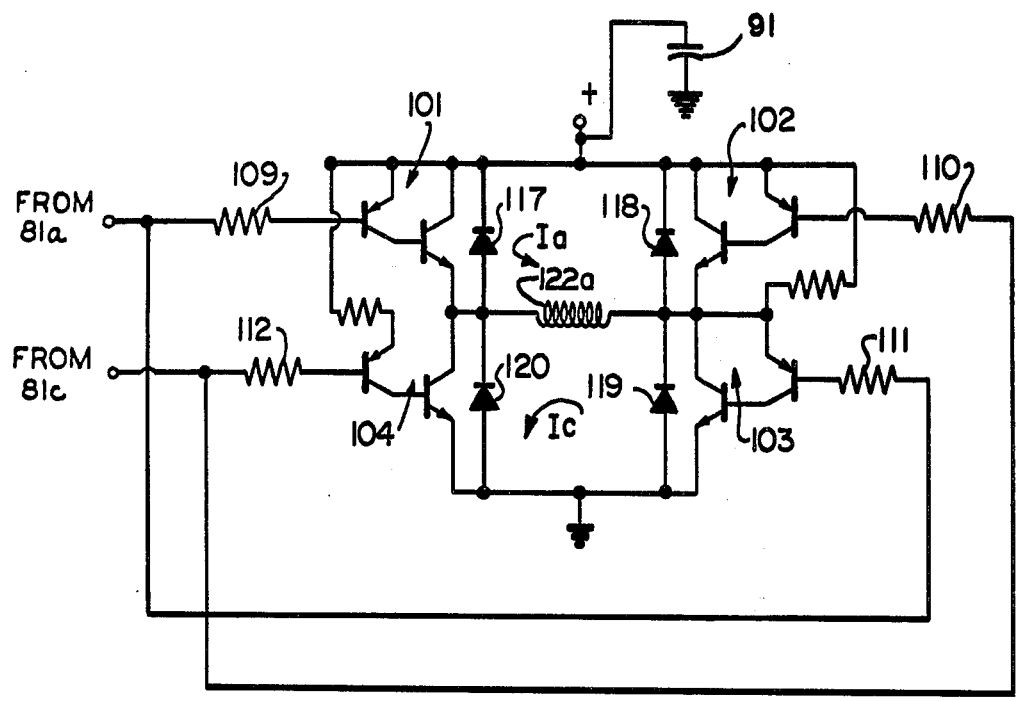
FIGS. 9 and 10 are schematic diagrams of a solid state commutating circuit embodying features of the present invention, and arranged for switching the windings of the motor of FIG. 1 when such windings are connected in a bridge configuration.
Figure 10:
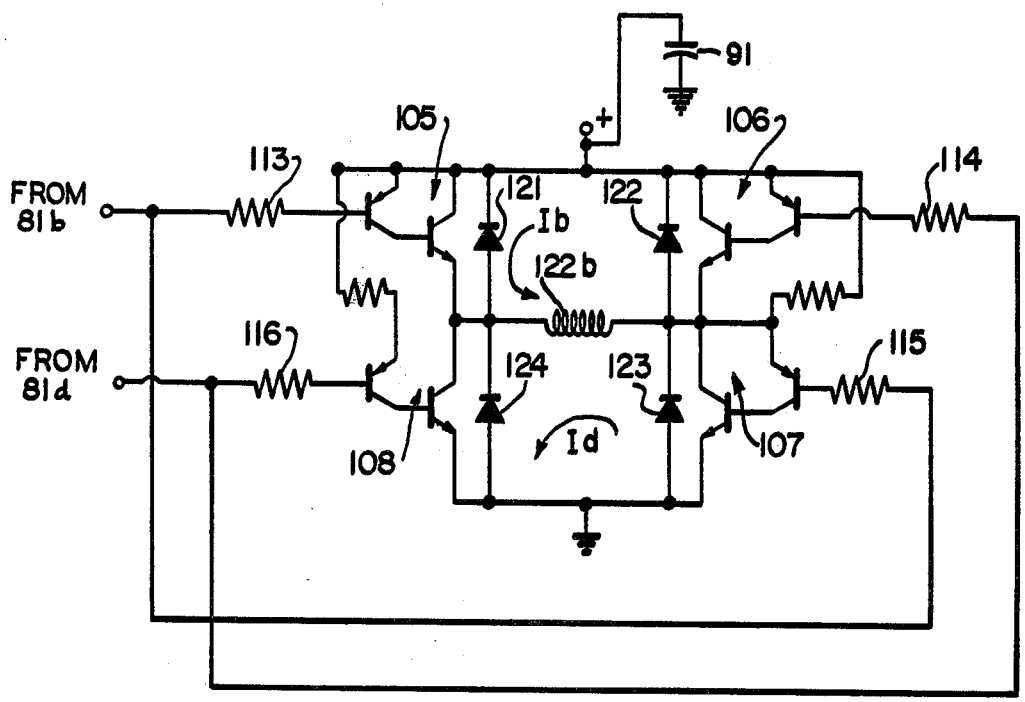

In accordance with the arrangement shown in FIGS. 9 and 10, the stator windings 122a and 122b are wound in the same manner as the stator windings 22a and 22b of the star configuration of FIG. 6. Thus, instead of using bifilar strands as was done with windings 22a, 22c, only single strands are employed and a particular winding is switched in by switching of a pair of transistors. To this end, four power switch sets 101–108 are provided for each pair of windings. Each power set comprises a pair of NPN transistors arranged in a Darlington configuration. The base of the input transistor of each power set is connected through its associated base resistor 109–116 to the output of a transistor amplifier 81 of one of the channels in a manner shown, for example, in FIG. 6. The a channel output of transistor 81a is connected to the input of power switch set 101 and 103, the b channel to sets 105 and 107, the c channel to sets 102 and 104 and the d channel to sets 106 and 108. Winding 122a is energized when current $I_a$ flows with the power sets 101 and 103 turned on. Winding 122a, in effect, acts like winding 22c of FIGS. 2 and 6 when power sets 102 and 104 are turned on and current $I_c$ flows. The bridge circuit for switching in winding 122b operates in a like manner when current $I_b$ and $I_d$ flow. Each transistor is provided with a protective diode 117–124 connected across the emitter-collector terminals and poled to provide a path for the current associated with stored inductive energy which is released when the transistors are turned off.

The aforedescribed circuit arrangements provide a relatively simple, but highly efficient and economic, means for controlling the commutation of a motor embodying the present invention.

Advanced timing angle (or advancement of commutation) is defined in accordance with FIG. 3. Zero advance would exist if a winding was turned on when the magnetic center of a rotor magnet was moving theretoward and at the instant that the magnetic center of the rotor was 135 electrical degrees from alignment with the axis of the magnetic pole established thereby. This would be the theoretical optimum. However, switching of the winding 10 electrical degrees before this theoretical optimum position is reached, constitutes a 10° advancement of commutation. The preferred amount of advancement of the timing angle is associated with the L/R time constant of the winding. At 0 electrical degrees advance, the current in the winding builds up too slowly to achieve maximum possible torque throughout its full "on" time. Advancing the commutation angle, however, takes advantage of the fact that the generated back emf is less during incomplete coupling, i.e., when the polar axes of the rotor and winding are not in exact alignment, and current build-up time and torque development can, therefore, be improved. Too great an advance incites current overshoots with consequent adverse effects on efficiency, but the optimum setting of the advance depends to some extent on the desired speed and torque operating points of the particular motor. Timing angle is preselectively adjusted by peripheral rotation of bracket 42, which positions the light coupling sensors 43 and 44 with relation to shutter flange 46.

With continued reference to FIG. 3, the center of the north and south magnetic poles established by winding 22b of FIG. 2 have been indicated by the reference notation Nb and Sb, respectively. The general location of the polar axes or centers of magnets 13, 14, on the other hand, are represented by the rotation N, S. It is to be understood that north and south poles Nb, Sb, are established by winding 22b when it is energized as indicated in FIG. 2.

During motor operation, windings 22a, 22b, 22c, and 22d, are commutated in sequence; and as the poles Nb, Sb (associated with winding 22b) disappear; the poles Nc, Sc (associated with winding 22c) appear. It will be noted from FIG. 3 that the center of magnetic poles S of magnet 14 is positioned 45 electrical degrees past pole Sb. In theory, winding 22b should be switched on at this instant to establish poles Nb, Sb; and winding 22b should remain energized for ninety electrical degrees. Then, winding 22b would be switched off and winding 22c would be switched on, assuming clockwise rotation of the rotor as indicated by arrow R in FIG. 3.

I have found that better performance results when I effect commutation of the windings in advance of the theoretically desirable switching point or angle by a predetermined angle (inelectrical degrees) $\alpha$.

For the embodiment having a winding arrangement as described hereinabove, the angle alpha equaled about twenty electrical degrees. Thus, winding 22a was de-energized, and winding 22b was energized to establish poles Nb, Sb when the axis of poles Sb of magnet 14 was about 145 electrical degrees therefrom. Ninety electrical degrees later, winding 22b was de-energized and winding 22c was energized so as to establish poles Nc, Sc. This then continues of course for the four windings 22a, b, c, d, as will be understood.

Figure 11A:
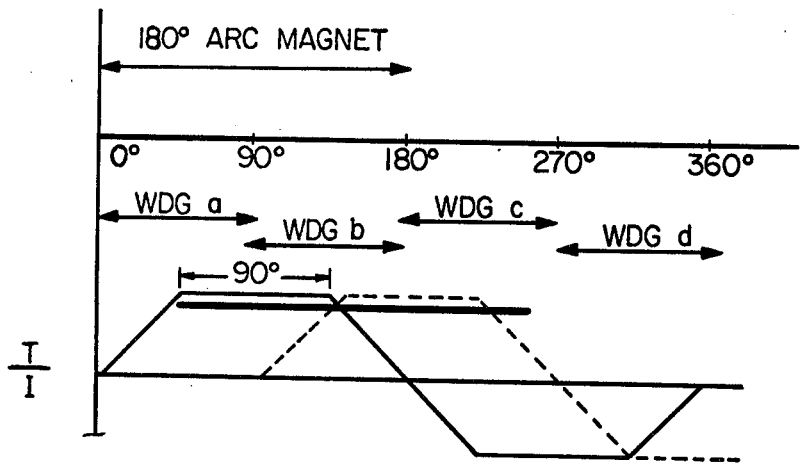
FIGS. 11A–C are graphical representations of torque per ampere as a function of rotor position, magnet arc length and distribution of turns for magnet arc lengths of 180 electrical degrees, 160 electrical degrees, and 135 electrical degrees, respectively; and schematically illustrate different arc lengths of rotor magnet arc lengths.
Figure 11A:
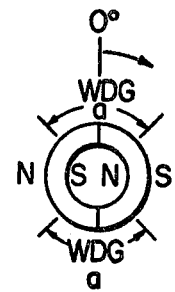

Although oppositely located winding sections can be coupled simultaneously by opposing magnets of the rotor, all turns of a given winding may not be fully coupled due to the distributed nature of the windings and foreshortening of the rotor magnets. Because of this the output torque per ampere input to the stator or armature winding (T/I) is a function of rotor position and the number of effective winding turns. FIGS. 11A, B, C reveal the effect on the ratio T/I when magnets of different arc lengths are used with a given stator or armature configuration.

FIGS. 11A represents a plot of T/I when the magnet arc length is 180 electrical degrees and the windings 22a, b, c, d have the same number of turns in each slot. The solid trapezoidal curve shows instantaneous torque per ampere for a constant value of current flowing in winding 22a if that winding is energized or left "on" for a full revolution of the rotor. The dashed trapezoidal curve is similarly drawn for winding 22b to represent its instantaneous torque per ampere contribution. The heavy solid curve displays a net effect of winding 22a being "on" for 90 electrical degrees only, and winding 22b being "on" for 90 electrical degrees and so on for windings 22c and 22d. The heavy solid curve is displaced from the other curves for illustration convenience.

Figure 11B:
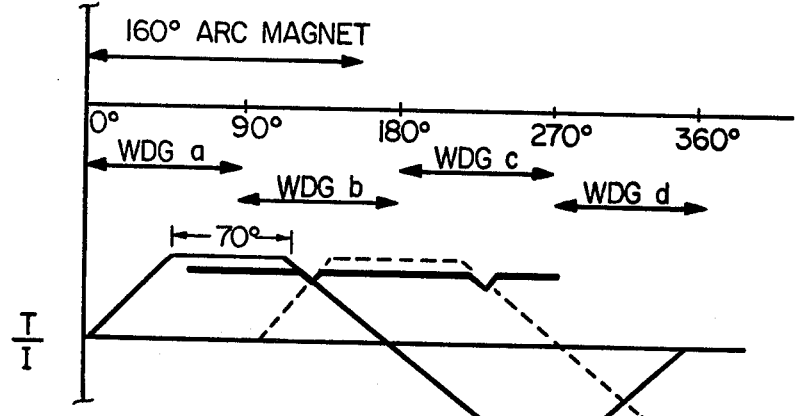
Figure 11B:
Figure 11C:
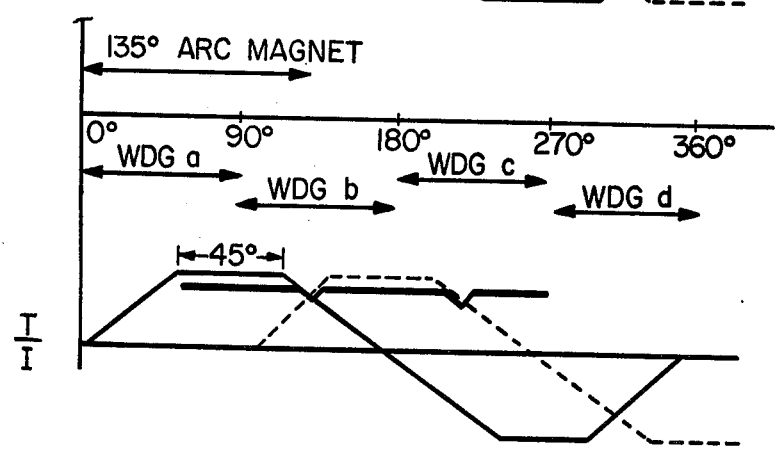
Figure 11C:
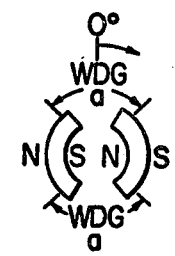
Figure 12:
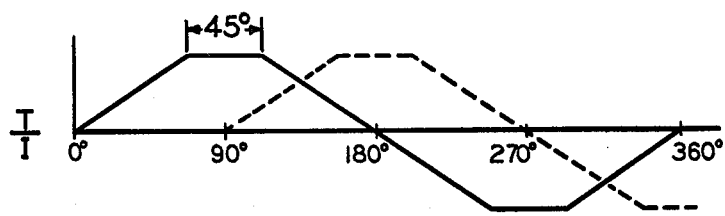
FIGS. 12–15 are plots of torque per ampere as a function of rotor position (in electrical degrees) for different amounts or extends of spread (or relative concentration) of stator windings.
Figure 13:
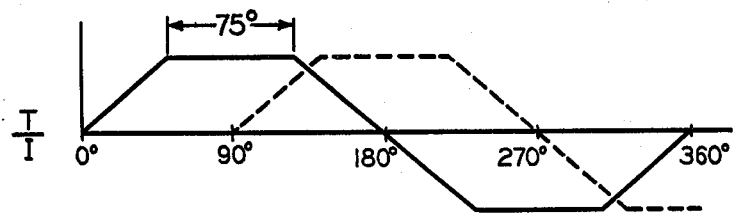
Figure 14:
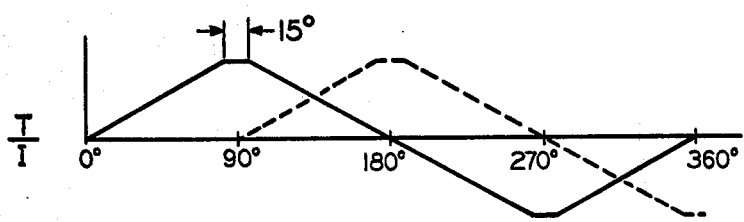
Figure 15:
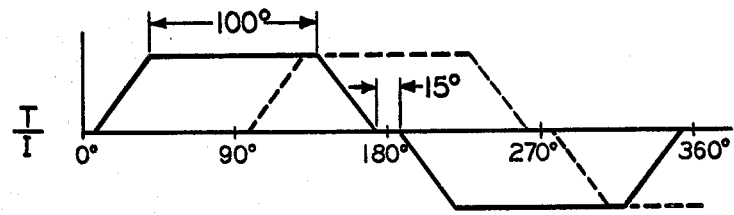

Winding 22a is turned on at approximately 45 electrical degrees after the polar axes of the rotor magnets have passed the center of the poles to be established by winding 22a. The distributed windings are thus seen to introduce a trapezoidal shape to the instantaneous torque in contrast to the theoretical ideal square shape which would otherwise be obtained for an ideal case utilizing concentrated windings. It is to be noted that each of FIGS. 11A–C schematically depict the arcuate length of various rotor magnets as well as the "spread" of the winding conductors of winding 22a. "Spread" is used to indicate the angular expanse of adjacent stator slots that carry the conductors of a given winding. Thus, in FIG. 2, each winding has two groups of conductors, disposed in slots, and each group has a spread of 90 electrical degrees (six slots).

FIG. 11B illustrates the torque per ampere developed as a function of rotor position, utilizing an arc magnet having an arc length of 160 electrical degrees. The windings are, again, assumed to be ideally or uniformly distributed and winding current to be at a constant value. The instantaneous torque per ampere as a function of rotor position curve retains its trapezoidal shape, as in FIG. 11A, but the build-up is slower and the time at maximum torque is shorter. The net or average torque, however, is only slightly reduced. These effects are emphasized still further for a magnet having an arc length of 135 electrical degrees as revealed by FIG. 11C.

In taking into account winding inductance and rotor speed of motors constructed as taught herein, it was observed that optimum torque at rated load occurred when the windings were energized in advance by approximately 20 electrical degrees. Because of this, magnet arc length can be reduced from 180 electrical degrees to 160 electrical degrees with essentially no loss in motor performance. The value of 135 electrical degrees for magnet arc length is, also, significant in that it represents an optimum choice from a manufacturing standpoint in that best yields for processes used to produce ferrite magnets result when arc segments are normally at 135 mechanical degrees (it being noted that mechanical degrees are equal to electrical degrees for two-pole motors). Moreover, magnets having arc lengths as low as 120 electrical degrees can be utilized without substantially sacrificing motor performance and efficiency. In preferred embodiments that have been constructed and tested however, the arc length of the magnets have been between 135 and 160 electrical degrees.

The curves of FIG. 11 are ideal representations of torque per ampere. They depart from the ideal when winding inductance, rotor speed and advance timing angle are taken into account. Inductance slows the rate of current rise, so that L/R time constant of the windings becomes an increasingly important factor as higher rated speeds are selected. As a general rule, the advance timing angle is greater for higher speeds, but optimum performance is achieved when winding turn off or commutation occurs nearly on a flat portion of the torque curves of FIGS. 11A–C, and turn on occurs on a rising portion of these same torque curves.

FIGS. 12–15 are similar to FIGS. 11A–C at least to the extent that the former are idealized plots of the ratio T/I (torque per ampere) for a motor such as the one of FIG. 1 as a function of rotor position for different amounts or extents of stator winding spread. In FIGS. 12–15, the solid trapezoidal curves show instantaneous torque per ampere that would result if one winding (e.g., winding 22a) were left "on" for a full revolution of a rotor. The dashed trapezoidal curves are similarly drawn for another winding (e.g., winding 22b). The data for curves 12–15 are based on an assumption that a single two rotor having magnet arcs of 135 electrical degrees is used with stators having different winding spans or concentrations. The curves of FIGS. 12–15 would result, respectively, with winding set side turn spreads of 90, 60, 120, and 30 electrical degrees, respectively. The duration or extent, in electrical degrees, of the flat portions of the curves in FIGS. 12–15 have been denoted in the drawing figures. It will be noted that the duration of such flat portions decrease with increasing coil side turn spreads. Stated conversely, increasing coil side turn concentrations cause increased flat portion (maximum T/I) duration.

The curves of FIGS. 12–15 are based on winding distributions that are assumed to provide an equal number of turn segments per slot. As will be appreciated from FIGS. 1 and 2, windings 22 include end turn portions disposed along the end faces of the stator core, and side turn portions that are disposed along the axially extending stator core slots.

Taking winding 22b as exemplary, and referring to FIG. 2, winding b is formed of two sections or coil groups. Each of these groups have three concentric coils, with each coil comprised of a plurality of turns and with side turn portions of such coils in a stator slot. The span of the outermost coil of each coil group determines the span of each coil group. However, the "spread" or "concentration" of winding 22b is determined by the collective arcuate span of one half of the side turn portions of both coil groups.

Thus, all of the conductors of winding 22b that carry current into the plane of FIG. 2 (or out of the plane of the drawing) collectively establish a "spread" of 90 electrical degrees. If the winding 22b consisted of two coil groups that each had only one coil and these coils shared the same slot, then maximum "concentration" or minimum "spread" would be achieved.

It will be understood from a comparison of FIGS. 11A–C and 12–15 that maximum values of T/I will be of longer duration if the winding "spread" is minimized and the rotor magnet arc length is maximized.

When maximum torque over a full rotor revolution is desired, the wave forms of FIGS. 11A–C and 12–15 should be kept "flat" as long as possible. However, if the duration of maximum T/I were a theoretical maximum of 180 electrical degrees, a square wave would result. In other words, the leading part of the wave form would become infinitely steep. However, with steeper the wave forms, there is more possibility of starting problems. Therefore, I prefer that the leading part of the wave form be as steep as possible without causing objectionable starting problems. In this connection it should also be noted that running requirements may require more winding turns, and therefore a greater winding "spread". This in turn results in a less "steep" wave form, which in turn would cause a need for a greater advancement of commutation for optimized running efficiency.

It will now be apparent that I have shown and described different embodiments of my invention, in preferred forms thereof. At the present time, the star connection arrangement utilizing bifilar windings is believed to be the better mode as compared to a monofilar/bridge circuit arrangement.

This is because less transistors are required for the star approach and therefore less expense is involved even though less efficient utilization of winding material (e.g., copper or aluminum) results. On the other hand, if and when the relative expense of transistors and winding material changes in favor of solid stator devices, the monofilar/bridge circuit would be preferred.

When either approach is followed, it is definitely preferable to provide energy storage means (e.g., as described hereinabove) in order not only to protect the output transistors but to improve the efficiency of energy utilization.

When either approach is used, methods embodying other aspects of my invention may be practiced, of course. For purposes of summary, such methods relate of course to the manufacture of brushless DC motors (whether or not they are of the electronically commutated variety), and include: the selection of AC induction motor types of cores; the development of distributed windings in slots of such cores by means of available AC induction motor equipment to form wound stator assemblies; and the assembly of such wound stator assemblies with permanent magnet rotor assemblies. The development of the distributed windings preferably includes the provision of at least two coil groups for optimization, four coil groups), that each comprise one or more concentric coils of one or more turns each.

The winding turns may be wound and established (concurrently or sequentially) in coil receiving means and then axially inserted into the axially extending core slots (either directly from the coil receiving means or from an axial inserting means to which the winding turns are transferred from the coil receiving means).

It should be recognized that the methods just briefly summarized represent a departure from the art of making DC motors of which I am aware. For example, prior techniques have involved the formation of what are known as "ring" windings (e.g., wave or alp windings) which are disposed on a conventional DC dynamoelectric machine core.

To better reveal the improved characteristics of motors embodying the invention, the data of Table I is presented.

TABLE I

| Advance, α in Electrical Degrees | Data taken at 2600 rpm | | | |
|---|---|---|---|---|
| | Torque Total | Oz.Ft. Net | Efficiency, % Total* | Net** |
| 0 | 1.15 | .95 | 73.7 | 60.9 |
| 5 | 1.20 | 1.00 | 78.2 | 65.2 |
| 15 | 1.50 | 1.30 | 81.2 | 70.4 |
| 22 | 1.60 | 1.35 | 77.7 | 65.6 |

*without regard to windage and friction loss
**including windage and friction loss The data of Table I was obtained by testing one motor that embodies the present invention and that was operated from a 12 volt DC supply.

The motor utilized a standard stator lamination design that is used commercially in induction motor applications. The lamination was substantially identical to the lamination shown in FIG. 2. The bore of the core was about 2 inches with a stack height of about 2 inches. The core had 24 slots, and carried distributed copper magnet wire winding side turn portions that were bifilar wound. Eight winding coil groups total (four bifilar coil groups) were used. Each coil group included three coils and each coil comprised from outermost coil to innermost coil respectively: 7, 10, and 10 turns. The wire was about 0.05 diameter (uninsulated) copper wire. The coils of each coil group spanned, from outer to inner coils respectively, 11, 9, 7 teeth respectively. Thus, the "spread" of an associated pair of coil groups was six slots or 90 mechanical degrees. It thus will be understood that eight slots contained 14 conductors (seven bifilar conductor pairs), while the rest of the slots had 20 conductors each.

The rotor magnets were formed of ferrite magnet material from Allen Bradley Co. and designated as M-7 material. The arc length of each of the two magnets used was 143 mechanical degrees; the thickness was about 0.25 inches; and the axial length was about 2 inches. The magnets were epoxy bonded to a solid, soft iron rotor core and the assembled rotor had an outer diameter of about 1.98 inches. Commutation and sensing was accomplished with circuits substantially identical to those shown herein. The actual circuit components (i.e., transistors, resistors, capacitors, etc.) were commonly available types and were selected to have only sufficient voltage and current ratings and gain to supply up to 30 amperes to the motor windings. The motor was commutated with from zero to 22 electrical degree advance. Since the motor was a two-pole motor, electrical degrees were of course equal to mechanical degrees.

In Table I, two efficiency and torque columns are recorded. The total torque represented the torque produced by the motor without regard to windage and friction losses. The first "efficiency" column also was the efficiency of the motor without regard to windage and friction losses, although copper and commutator circuit losses were allowed for. Net torque was the net torque available at the shaft of the motor, and net efficiency was the overall efficiency of the motor system including the commutator. The significant reduction in net efficiency (due to windage and bearing losses) was expectable because the motor tested was only about 1/20 horsepower.

Table I does show the significant improvement in efficiency and torque that is attainable by advancement of commutation. Thus, a 15 electrical degree advance would provide significantly more maximum efficiency at 2600 rpm; whereas an advance of 22 degrees would provide significantly greater maximum torque at 2600 rpm.

While the invention has been described in connection with different embodiments thereof, variations will be readily apparent to those skilled in the art from reading the foregoing description. Thus, in accordance with the Patent Statutes, I have described what at present is considered to be preferred embodiments of my invention, but it is to be clearly understood that this description is made only by way of example and not for purposes of limitation.

What I claim as new and desire to secure by Letters Patent of the United States is:

1. A brushless DC motor having a stationary armature comprising an armature core and a plurality of winding turns disposed on said armature core, a permanent magnet rotor adapted to rotate about a longitudinal axis in response to magnetic fields established by said armature, means for developing position control signals indicative of the rotational position of said rotor and operative for causing commutation of each of the windings at an advancement angle before the rotor rotates to a position such that the center of a magnetic pole thereof of a first polarity is displaced 135 electrical degrees from the center of a magnetic pole of a polarity opposite to said first polarity and established by the winding being commutated.

2. A brushless DC motor as set forth in claim 1 further including fixed and movable position sensing elements with at least one of such elements including a source of energy, said source of energy comprising a first and a second light source spaced from each other; said motor further including sensing means coupled to receive energy from the energy source and comprising first and second light sensors associated with each light source, said light sources each being a light emitting diode and said light sensors each being a phototransistor, and said movable element including a flange that is supported to said rotor such that said flange passes between the diodes and phototransistors to effect periodic interruption of the energy coupled therebetween upon rotation of the rotor.

3. A brushless DC motor having a stationary armature comprising an armature core and a plurality of winding turns disposed on said armature core, a permanent magnet rotor adapted to rotate about a longitudinal axis in response to magnetic fields established by said armature, means for developing position control signals indicative of the rotational position of said rotor including at least one fixed element and at least one movable element, said at least one movable element being rotatable relative to said fixed element, one of said elements including an energy transmitter and sensing means coupled to receive energy from the energy transmitter, the other of said elements including means for periodically interrupting the energy transmitted from the transmitter, a bracket mounted in fixed predetermined relation to said armature for supporting said fixed element in fixed relation to said armature, said movable element being mounted to said rotor for rotation therewith, said bracket being positioned with respect to said stationary armature and to said rotor such that said movable element periodically interrupts the energy coupled between said fixed element and said movable element so as to provide position control signals and establish advancement of commutation of the armature winding turns; said bracket comprising a first segment fixed to said stationary armature and a second segment supported radially inward of the first segment for supporting said fixed element; and said motor further including means for interconnecting said first and said second segments, said interconnecting means being shaped to pass over at least some of the end turns of the winding turns such that said fixed element is positioned within said end turns.

4. A brushless DC motor having a stationary armature including a core and at least two windings disposed on said core to produce at least two separate magnetic fields, a permanent magnet rotor adapted to rotate about a longitudinal axis in response to the at least one magnetic field established by said armature, means for providing control signals indicative of the angular position of said rotor relative to the armature; said means for providing being operative to provide commutation signals that effect commutation of a given winding at a predetermined electrical advancement angle before the rotor rotates to a position such that the center of a magnetic pole thereof of a first polarity is displaced 135 electrical degrees from the center of a magnetic pole of a polarity opposite to said first polarity and established by said given winding.

5. A brushless DC motor as set forth in claim 4 wherein said motor includes position sensing means that include light source means comprising a first and a second light emitting diode, and further includes receiver means comprising first and second phototransistors, each associated with a light source in light coupling relationship therewith; one source and receiver pair being spaced from another source and receiver pair by an arc length of 90 electrical degrees.

6. A brushless DC motor having a stationary armature including a core and at least two windings disposed on said core to produce at least two separate magnetic fields, a permanent magnet rotor adapted to rotate about a longitudinal axis in response to the at least one magnetic field established by said armature, shaft position sensing means for providing position control signals indicative of the angular position of said rotor relative to the armature; said position sensing means being positioned relative to said armature so that commutation signals are provided to effect commutation of a given winding at a predetermined electrical advancement angle before the rotor rotates to a position such that the center of a magnetic pole thereof of a first polarity is displaced 135 electrical degrees from the center of a magnetic pole of a polarity opposite to said first polarity and established by said given winding; said position sensing means including optical sensing means and a shutter that includes a flange extending axially from the rotor and movable therewith, said sensing means including light source means comprising a first and a second light emitting diode, and further including receiver means comprising first and second phototransistors, each associated with a light source in light coupling relationship therewith, with one source and receiver pair being spaced from another source and receiver pair by an arc length of 90 electrical degrees; said windings including end turns extending beyond at least one end face of the armature core, and said motor further including a bracket mounted to support the light source and receiver means within an envelope established by said end turns.

7. A brushless DC motor having a stationary armature including a core and a plurality of stator windings disposed on said core to produce angularly directed magnetic fields; a permanent magnet rotor adapted to rotate about a longitudinal axis in response to magnetic fields established by said armature; said stator windings including end turns extending beyond at least one end face of the core, shaft position sensing means supported at one end of said rotor and within the end turns at that end for providing position control signals indicative of the angular position of said rotor relative to the armature; said sensing means including an energy source and a receiver positioned to be coupled with and to receive energy from said source; a bracket mounted in fixed predetermined relation to said armature for supporting said sensing means; and a shutter mounted for movement with said rotor and positioned with respect to said sensing means such that said shutter periodically decouples the energy source and receiver during rotation of the rotor.

8. A DC motor comprising a stationary armature comprising a core having a longitudinal axis and at least two windings disposed on said core to produce differently directed magnetic fields, a permanent magnet rotor adapted to rotate about said longitudinal axis in response to magnetic fields established by said armature, means for providing signals indicative of the relative rotational position of said rotor, and circuit means responsive to said signals for energizing said stator windings in a predetermined sequence, said means for providing being operative to cause advancement of commutation of the windings by an angle alpha of from about five to about 25 electrical degrees to aid the build-up of current when the windings are energized during running condition.

9. A DC motor as set forth in claim 8 wherein said stator windings include at least four effective windings; said circuit means comprises a first signal conditioning circuit responsive to the position signals for developing position control signals and a second signal conditioning circuit responsive to said control signals to control current switching in the stator windings; and said second conditioning circuit includes independent switching means connected to each winding, and each said switching means is responsive to said control signals to control current switching in the associated winding.

10. A DC motor as set forth in claim 8 wherein said permanent magnet rotor comprises a core of magnetic material and a pair of diametrically opposed arcuate magnetic regions disposed on the periphery thereof, the arc length of each said magnetic region being within a preferred range of 120 and 170 electrical degrees.

11. A DC motor comprising a stationary armature comprising a core having a longitudinal axis and at least two windings disposed on said core to produce differently directed magnetic fields, a permanent magnetic rotor adapted to rotate about said longitudinal axis in response to magnetic fields established by said armature, means for providing signals indicative of the relative rotational position of said rotor, and circuit means responsive to said signals for energizing said windings in a predetermined sequence, said means for providing being operative to cause advancement of commutation of the windings by an angle alpha of from about five to about 25 electrical degrees to aid the build-up of current when the windings are energized during running condition, said windings comprising at least two concentrically disposed coil groups each having a predetermined span and mutually establishing a predetermined spread of conductive segments in slots of the core.

12. A DC motor as set forth in claim 11 wherein each said predetermined spread is in a preferred range of from about thirty electrical degrees to about one hundred and twenty electrical degrees.

13. A DC motor as set forth in claim 11 wherein the coil groups are arranged in pairs and each pair is formed of bifilar strands that share common slots.

14. A DC motor as set forth in claim 13 wherein said windings are connected in a star configuration.

15. A DC motor as set forth in claim 11 including means for interconnecting said windings and said circuit means in a bridge configuration.

16. A DC motor comprising a stationary armature comprising a core having a longitudinal axis and at least two windings disposed on said core to produce differently directed magnetic fields, a permanent magnet rotor adapted to rotate about said longitudinal axis in response to magnetic fields established by said armature, means for providing signals indicative of the relative rotational position of said rotor, and circuit means responsive to said signals for energizing said windings in a predetermined sequence, said means for providing being operative to cause advancement of commutation of the windings by an angle alpha of from about five to about 25 electrical degrees to aid the build-up of current when the windings are energized during running condition; said windings including at least four effective windings; said circuit means comprising a first signal conditioning circuit responsive to said signals for developing relative position control signals and a second signal conditioning circuit responsive to said control signals to control current switching in the windings; and said second signal conducting circuit including independent switching means connected to each winding, and each said switching means being responsive to said control signals to control current switching in the associated winding; said second signal conditioning circuit including a plurality of signal channels, one for each winding, each said channel including a first stage responsive to the level of at least two position control signals to develop a control output signal and switching means responsive to said control output to effect current switching in the winding associated with that channel.

17. A DC motor as set forth in claim 16 including protective means connected across each said switching means for shunting current developed in the windings due to a decaying magnetic field of a disconnected winding and further including means for absorbing energy released by the decaying magnetic field of a de-energized winding and returning said energy to the next energized winding.

18. A DC motor comprising a stationary armature comprising a core having a longitudinal axis and at least two windings disposed on said core to produce differently directed magnetic fields, a permanent magnet rotor adapted to rotate about said longitudinal axis in response to magnetic fields established by said armature, means for providing signals indicative of the relative rotational position of said rotor, and circuit means responsive to said signals for energizing said windings in a predetermined sequence, said means for providing being operative to cause advancement of commutation of the windings by an angle alpha of from about five to about 25 electrical degrees to aid the build-up of current when the windings are energized during running condition; said windings including at least four effective windings; said circuit means comprising a first signal conditioning circuit responsive to said signals for developing relative position control signals and a second signal conditioning circuit responsive to said control signals to control current switching in the windings; and said second signal conditioning circuit including independent switching means connected to each winding, and each said switching means being responsive to said control signals to control current switching in the associated winding; said second signal conditioning circuit including protective means for shunting current developed in the windings due to a decaying magnetic field of a de-energized winding.

19. A DC motor comprising a stationary armature comprising a core having a longitudinal axis and at least two windings disposed on said core to produce differently directed magnetic fields, a permanent magnet rotor adapted to rotate about said longitudinal axis in response to magnetic fields established by said armature, means for providing signals indicative of the relative rotational position of said rotor, and circuit means responsive to said signals for energizing said windings in a predetermined sequence, said means for providing being operative to cause advancement of commutation of the windings by an angle alpha of from about five to about 25 electrical degrees to aid the build-up of current when the windings are energized during running condition; said windings including at least four effective windings; said circuit means comprising a first signal conditioning circuit responsive to said signals for developing relative position control signals and a second signal conditioning circuit responsive to said control signals to control current switching in the windings; and said second signal conditioning circuit including independent switching means connected to each winding, and each said switching means being responsive to said control signals to control current switching in the associated winding; said motor further including means for absorbing energy released by a decaying magnetic field of a disconnected winding.

20. A DC motor as set forth in claim 19 wherein said means for absorbing energy is a capacitor.

21. A DC motor comprising a stationary armature comprising a core having a longitudinal axis and at least two windings disposed on said core to produce differently directed magnetic fields, a permanent magnet rotor adapted to rotate about said longitudinal axis in response to magnetic fields established by said armature, means for providing signals indicative of the relative rotational position of said rotor, and circuit means responsive to said signals for energizing said windings in a predetermined sequence, said means for providing being operative to cause advancement of commutation of the windings by an angle alpha of from about five to about 25 electrical degrees to aid the build-up of current when the windings are energized during running condition; said motor further including means for recovering energy released by a decaying magnetic field of a winding when it is de-energized.

22. A DC motor comprising a stationary armature having a longitudinal axis and including a plurality of stator windings, for producing spaced apart magnetic fields, a permanent magnet rotor adapted to rotate about said longitudinal axis in response to magnetic fields established by said armature, a predetermined number of sensors for sensing positions of the rotor with adjacent sensors spaced from each other by approximately 90 electrical degrees; the number of sensors being equal to the number of binary digits, minus one, that are descriptive in binary notation of the number of switching positions of the motor for each 360 electrical degrees of rotor rotation; circuit means responsive to said position signals for providing switching signals associated with said windings, and including switching means responsive to said switching signals for energizing said stator windings in a predetermined sequence; said armature comprising a low reluctance magnetic member having a plurality of axially extending slots, and said stator windings comprising a plurality of concentrically disposed winding turns.

23. A DC motor comprising a stationary armature having a longitudinal axis and including a plurality of windings, for producing spaced apart magnetic fields, a permanent magnet rotor adapted to rotate about said longitudinal axis in response to magnetic fields established by said armature, a predetermined number of sensors for sensing positions of the rotor with adjacent sensors spaced from each other by approximately 90 electrical degrees; the number of sensors being equal to the number of binary digits, minus one, that are descriptive in binary notation of the number of switching positions of the motor for each three hundred and sixty electrical degrees of rotor rotation; circuit means responsive to said position signals for providing switching signals associated with said windings, and including switching means responsive to said switching signals for energizing said stator windings in a predetermined sequence; said circuit means further including protective means for recovering energy released by a decaying magnetic field of a disconnected winding.

* * * * *

UNITED STATES PATENT AND TRADEMARK OFFICE
CERTIFICATE OF CORRECTION

PATENT NO. : 4,005,347
DATED : January 25, 1977
INVENTOR(S) : David M. Erdman

It is certified that error appears in the above-identified patent and that said Letters Patent are hereby corrected as shown below:

```
Col. 1, line 39, delete "and" and insert --than--;
        line 56, delete "hermatic" and insert --hermetic--;
        line 64, delete "component" and insert --components--.
Col. 2, line 22, after "provide" insert --an improved--;
        line 27, after "shaft" insert --position--.
Col. 3, line 22, change "relates" to --related--;
        line 31, delete "tht" and insert --that--.
Col. 5, line 33, delete "framentary" and insert --fragmentarily--;
        line 35, delete "alternatively" and insert
            --Alternatively--.
Col. 6, line  1, delete "b and" (second occurrence);
        line 11, delete "obtaind" and insert --obtained--;
        line 15, delete "stating" and insert --stator--;
        line 16, delete "conversion" and insert --construction--;
        line 44, delete "windings" and insert --winding--;
        line 63, delete "radical" and insert --radial--.
Col. 7, line 23, delete "positions" and insert --positioned--;
        line 27, delete "optical" and insert --optically--;
        line 51, delete "the" and insert --be--;
        line 63, delete "mensions" and insert --mension--.
Col. 10, line 28, delete "part" and insert --past--.
Col. 12, line 29, delete "inelectrical" and insert --in electrical
```

Signed and Sealed this

Thirteenth Day of September 1977

[SEAL]

Attest:

RUTH C. MASON
Attesting Officer

LUTRELLE F. PARKER
Acting Commissioner of Patents and Trademarks